United States Patent [19]

Kosugi et al.

[11] 4,091,080

[45] May 23, 1978

[54] METHOD FOR THE PRODUCTION OF ALPHA TYPE CALCIUM SULFATE HEMIHYDRATE

[75] Inventors: Jyuniti Kosugi, Saitama; Yoshihiko Kudo, Tokyo; Kiyoshi Tagaya, Chiba, all of Japan

[73] Assignee: Kureha Kagaku Kogyo Kabushiki Kaisha, Tokyo, Japan

[21] Appl. No.: 732,429

[22] Filed: Oct. 14, 1976

[30] Foreign Application Priority Data

Oct. 17, 1975 Japan .................. 50-124313

[51] Int. Cl.$^2$ .......................... C01F 11/46; B01J 17/00
[52] U.S. Cl. .......................... 423/555; 23/300; 423/171
[58] Field of Search .......... 423/155, 170, 171, 172, 178, 423/265, 266, 551, 555, 559; 106/109, 110; 23/300, 304

[56] References Cited

U.S. PATENT DOCUMENTS

| | | | |
|---|---|---|---|
| 2,006,342 | 7/1935 | Booge et al. | 423/172 |
| 2,316,343 | 4/1943 | Kubeka et al. | 423/172 |
| 3,337,298 | 8/1967 | Ruter et al. | 423/555 |

OTHER PUBLICATIONS

Mellor, "A Comprehensive Treatise on Inorganic and Theoritical Chemistry" 1922, vol. 3, pp. 768–9, Longmans Green & Co., New York, N.Y.

*Primary Examiner*—O. R. Vertiz
*Assistant Examiner*—Gary P. Straub
*Attorney, Agent or Firm*—Lane, Aitken, Dunner & Ziems

[57] ABSTRACT

Alpha type calcium sulfate hemihydrate gypsum is obtained by suspending gypsum in an aqueous solution containing a specific monocarboxylate in a specific concentration and heating the resultant suspension in a specific temperature range under atmospheric pressure. The production of this alpha type calcium sulfate hemihydrate is accomplished at an increased rate by adding a specific monocarboxylic acid to the aqueous solution, suspending gypsum in the resultant solution and heating the resultant suspension in a specific temperature range under atmospheric pressure.

5 Claims, 3 Drawing Figures

METHOD FOR THE PRODUCTION OF ALPHA TYPE CALCIUM SULFATE HEMIHYDRATE

FIELD OF THE INVENTION

This invention relates to a method for the advantageous production of alpha type calcium sulfate hemihydrate, $\alpha\text{-CaSO}_4\cdot\frac{1}{2}\text{H}_2\text{O}$, and more particularly to a method for converting a gypsum having $\frac{1}{2}$ to 2 mols of crystal water into alpha type calcium sulfate hemihydrate having a high bulk density, under atmospheric pressure (namely, in the open air).

BACKGROUND OF THE INVENTION

It is widely known that calcium sulfate hemihydrate occurs in two forms, alpha type calcium sulfate hemihydrate and beta type calcium sulfate hemihydrate. The alpha type calcium sulfate hemihydrate is such that the plasticization thereof which is effected by addition of water can be obtained with a small amount of water. The plasticized alpha type calcium sulfate hemihydrate has a property such that, when molded and left to cure, it produces a shaped article of high strength. It is also known that the normal consistency of the alpha type calcium sulfate hemihydrate having a large crystal size and a high bulk density is small and accordingly the shaped article produced from such calcium sulfate hemihydrate has higher strength. In contrast, the beta type calcium sulfate hemihydrate has high normal consistency and the shaped article produced from this calcium sulfate hemihydrate has low strength.

As examples of the methods heretofore employed for the commercial production of alpha type calcium sulfate hemihydrate, there may be cited a pressurized steam method which includes exposing a naturally occurring gypsum or a chemically produced gypsum to hot steam under increased pressure so as to dehydrate the gypsum dihydrate, a pressurized aqueous solution method which includes converting a naturally occurring gypsum or a chemically produced gypsum into slurry by addition of water or an aqueous solution of crystallization accelerator and heating the slurry under increased pressure while keeping the slurry in an agitated state, and a method which combines these two methods. These methods, however, cannot be called advantageous from the commercial point of view, gfor they invariably are operated under pressure and consequently necessitate use of pressurized reaction vessels.

The situation has encouraged proposal of various methods directed to the production of alpha type calcium sulfate hemihydrate under atmospheric pressure (namely, in the open air) in order to replace the above-mentioned conventional methods which involve treatments under increased pressure. For example, there has been suggested a method which effects the production of alpha type calcium sulfate hemihydrate by suspending gypsum in an aqueous solution containing a soluble inorganic salt such as magnesium sulfate, magnesium chloride, sodium chloride or calcium chloride, an inorganic acid such as sulfuric acid, nitric acid or phosphoric acid or an alkali metal salt of an organic acid and heating the resultant suspension at a temperature falling in the range from 80° C to the boiling point of the aqueous solution. This method allows of a modified embodiment which additionally includes incorporating into the aqueous solution a small amount of an organic acid such as citric acid, tartaric acid or palmitic acid or a salt or ester thereof or an organosulfonic acid or a salt or ester thereof to serve as a crystallization accelerator. However, these atmospheric pressure methods have not yet been perfected to the extent of being commercialized, because the shaped articles molded of the alpha type calcium sulfate hemihydrate produced by such methods are still deficient in strength.

In the atmospheric pressure method described above, use of the aqueous solution containing an alkali metal salt of organic acid as a medium for the dehydration reaction of gypsum is especially recommended for the purpose of lowering the dehydration reaction temperature. Either the sodium salt or potassium salt of an organic acid is preferably used as the alkali metal salt of organic acid. The alpha type calcium sulfate hemihydrate which is produced in this case exhibits extremely inferior physical properties, because the individual crystals making up the gypsum are small and the bulk density of the calcium sulfate is low and the gypsum itself contains the alkali metal salt such as in the form of double-salt eutectic crystals (for example, gypsum + sodium sulfate).

An exhaust gas such as the combustion exhaust gas discharged from a thermal power station contains sulfur oxides. When this exhaust gas is released untreated into the atmosphere, it may possibly cause air pollution. Thus, the removal of sulfur oxides from such exhaust gas has become an established custom in recent years. The sulfur oxides thus removed from the exhaust gas are mostly recovered in the form of gypsum. The gypsum thus recovered from the exhaust gas amounts to colossal volumes. In these circumstances, therefore, the development of new uses for the gypsum forms an important task. As one such use, the alpha type calcium sulfate hemihydrate has received keen attention. Since the conventional methods which involve treatments under pressure are not suitable for the treatment of huge volumes of gypsum, perfection of an advantageous atmospheric pressure method which is suited for the treatment of such gypsum has been a great desideratum.

SUMMARY OF THE INVENTION

It is, therefore, an object of this invention to provide a method for producing a desired alpha type calcium sulfate hemihydrate under atmospheric pressure (namely in the open air).

This and the other objects of the present invention will become apparent from the following description.

It has now been discovered that the gypsum issuing from the exhaust gas readily undergoes transition into alpha type calcium sulfate hemihydrate in large crystals and high bulk density when the gypsum is suspended in an aqueous solution of a specific fatty acid salt and the resultant suspension is heated under atmospheric pressure to a temperature falling in the range of from 80° C to the boiling point of the aqueous solution. We have also found that the transition of the gypsum to the alpha type calcium sulfate hemihydrate is accelerated when a specific fatty acid is also present in the aqueous solution.

According to this invention, there is provided a method for the production of alpha type calcium sulfate hemihydrate, which method includes suspending a calcium sulfate having $\frac{1}{2}$ to 2 mols of water of crystallization in an aqueous solution obtained by dissolving in water not less than 10% by weight of at least one member selected from the group consisting of magnesium salts of lower monocarboxylic acids having one to four carbon atoms and zinc salts of lower monocarboxylic acids having one to four carbon atoms, and heating the resultant suspension under atmospheric pressure at a temperature falling in the range of from 80° C to the boiling point of the aqueous solution. Further, according to this invention, there is provided a method for the production of alpha type calcium sulfate hemihydrate, which method includes adding to the above-mentioned aqueous solution a lower monocarboxylic acid having one to four carbon atoms, suspending a calcium sulfate having of ½ to 2 mols of water of crystallization in the resultant solution and heating the suspension under atmospheric pressure at a temperature falling in the range of from 80° C to the boiling point of the resultant solution.

DETAILED DESCRIPTION OF THE INVENTION

Figure 1:
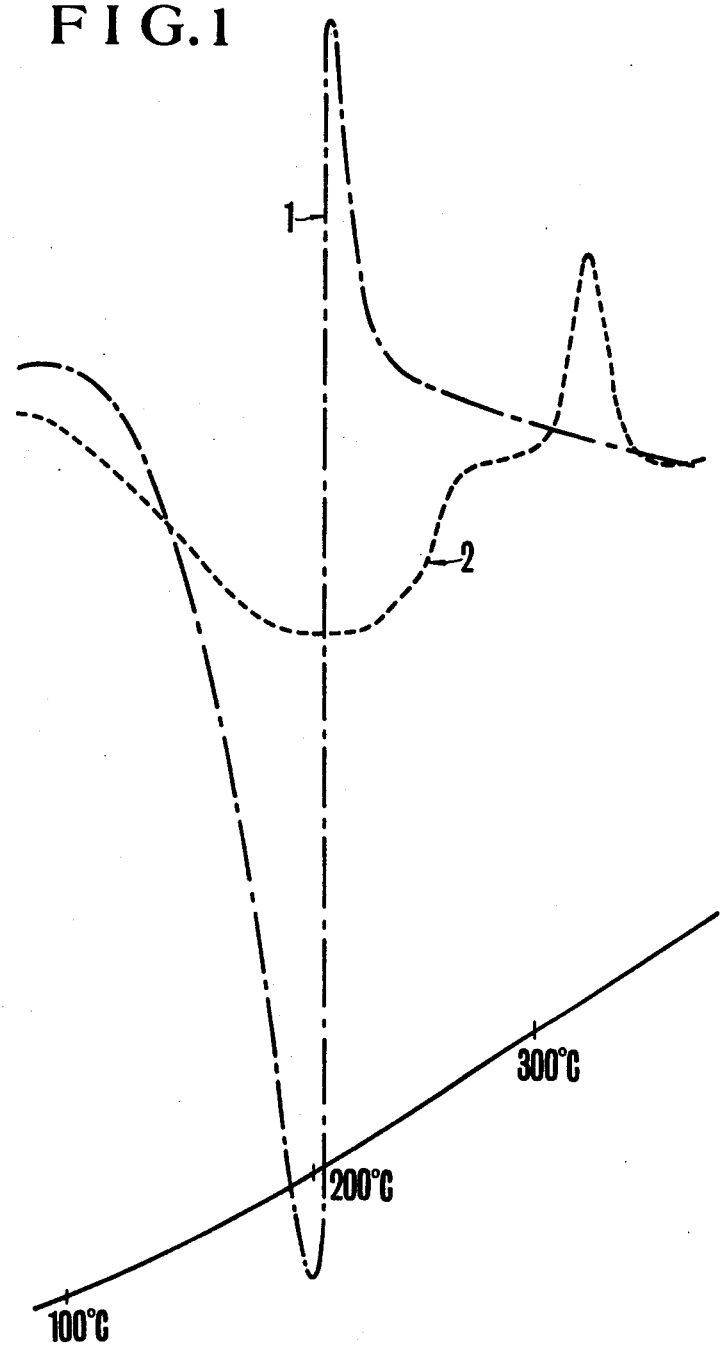
FIG. 1 is a diagram showing the differential heat absorption curves obtained from the calcium sulfate hemihydrate produced by the treatment of gypsum in Example 1.

Gypsum of any type which is not an alpha type calcium sulfate hemihydrate and which is possessed of ½ to 2 mols of water of crystallization will suffice as the starting material in the present invention. Specific examples of gypsum usable as the raw material in this invention include beta type calcium sulfate, gypsum hemihydrate, a mixture of alpha type calcium sulfate hemihydrate with beta type hemihydrated gypsum, a mixture of alpha type calcium sulfate hemihydrate with gypsum and a mixture of alpha type calcium sulfate hemihydrate with beta type calcium sulfate hemihydrate and gypsum.

In the present invention, the gypsum having ½ to 2 mols of water of crystallization is suspended in the aqueous solution of the invention. In this case, the gypsum may be used in an amount which will suspend in the aqueous solution adequately. The aqueous solution is obtained by dissolving in water not less than 10% by weight of at least one member selected from the group consisting of magnesium salts of lower monocarboxylic acids having one to four carbon atoms and zinc salts of lower monocarboxylic acids possessed of one to four carbon atoms. The suitable lower monocarboxylic acids are formic acid, acetic acid, propionic acid and butyric acid. Those monocarboxylic acids which have more than four carbon atoms cannot be used for the purpose of this invention because, in the form of magnesium or zinc salts they are scarcely soluble in water. When at least one member selected from the group consisting of magnesium salts of lower monocarboxylic acids having one to four carbon atoms and zinc salts of lower monocarboxylic acids having one to four carbon atoms is dissolved in water, the amount should be at least 10% by weight based on the water because, if the amount is less than 10% by weight, then the time of transition of the gypsum to the alpha type calcium sulfate hemihydrate is too long to render the operation commercially practicable. The magnesium salt (or salts) and/or zinc salt (or salts) of lower monocarboxylic acid (or acids) having one to four carbon atoms may be dissolved in water in any amount so long as the amount is not less than 10% by weight. Specifically, the amount may be increased up to the level corresponding to the solubility of each salt at the temperature to which the suspension produced from the aqueous solution will be heated at a latter step of operation.

Then in the present invention, the suspension obtained as described above by suspending the gypsum in the aqueous solution is heated under atmospheric pressure to a temperature falling in the range of from 80° C to the boiling point of the aqueous solution. Although the length of time for this heating is not specifically limited, it will suffice on the order of 1 to 5 hours. As the result, the gypsum in the suspension undergoes transition into the alpha type calcium sulfate hemihydrate. The produced alpha type calcium sulfate hemihydrate may be separated by filtration, for example.

The present invention also embraces a method which includes suspending gypsum having ½ to 2 mols of water of crystallization, not directly in the above-mentioned aqueous solution but, instead, in a solution produced by adding to the aqueous solution a lower monocarboxylic acid having one to four carbon atoms and then, similar to the step described above, heating the resultant suspension at a temperature falling in the range of from 80° C to the boiling point of the solution. By this further incorporation of the acid, the rate of the transition of the gypsum to the alpha type calcium sulfate hemihydrate can be accelerated. This may possibly be explained by assuming that the presence of the lower monocarboxylic acid in the solution results in an improvement in the solubility of the gypsum in the solution. Again in this case, the lower monocarboxylic acids suitable for this addition are formic acid, acetic acid, propionic acid and butyric acid. In the preparation of the solution, if the lower monocarboxylic acid is added in an excessively large amount to the aqueous solution, then the transition of the gypsum to the alpha type calcium sulfate hemihydrate proceeds at an excessively high speed and the individual crystals of the resultant alpha type calcium sulfate hemihydrate are quite small. Thus, the lower monocarboxylic acid is preferred to be added to the aqueous solution in an amount falling in the range of from 1 to 20 % by weight, more preferably from 5 to 20% by weight.

In accordance with this invention, there is produced alpha type calcium sulfate hemihydrate having a high bulk density. The shaped article molded of the gypsum thus produced enjoys high strength. Further, in order to produce an alpha type calcium sulfate hemihydrate having even superior physical properties, a crystallization accelerating agent can be added to the aqueous solution or the solution in which the calcium sulfate having ½ to 2 mols of water of crystallization is to be suspended. When the aqueous solution or the solution to be used contains the crystallization accelerating agent, the treatment can be expected to bring about an increased bulk density of the product gypsum and an enhanced strength of the shaped article to be molded of the gypsum. Any of the substances heretofore known as crystallization accelerating agents may be used. Examples include organic acids such as citric acid, tartaric acid and palmitic acid, salts and esters of these organic acids, organosulfonic acids and salts and esters thereof. When an organic acid salt is to be used as the crystallization accelerator, it is preferably in the form of a magnesium salt, rather than in the form of an alkali metal salt, because the alpha type calcium sulfate hemihydrate consequently obtained has a higher bulk density in the former case then in the latter case. The most advantageous crystallization accelerating agent is citric acid, magnesium citrate or zinc citrate. This agent is added in the proportion of 0.01 to 3% by weight to the aqueous solution or the solution.

According to the present invention, the desired alpha type calcium sulfate hemihydrate can easily be produced under atmospheric pressure (namely, in the open air) in the manner described above. If the gypsum used as the starting material happens to contain iron or other similar impurities, the form of the individual crystals of the product alpha type calcium sulfate hemihydrate is not affected by the presence of such impurities.

Now, the present invention will be described more specifically with reference to preferred embodiments. It should be noted that the scope of the invention is not limited to these examples.

EXAMPLE 1

The gypsum (containing 21% by weight of water) which had been recovered in the removal of sulfur dioxide from an exhaust gas containing sulfur dioxide by the sodium sulfite-gypsum process was used as the sample material. In a 30% solution of one of the various acetates indicated in Table 1 below, 10 parts by weight of the gypsum was added, boiled for three hours, filtered while hot and washed with hot water at 80° C. The calcium sulfate hemihydrate consequently produced was dried in a hot blast dryer at 90° C.

Table 1 shows the crystal form, the shaped and the size of crystals and the bulk density and the compressive strength of the gypsum thus obtained. FIG. 1 shows the results of the differential heat analysis (DTA) of the formed calcium sulfate hemihydrate. In the DTA curves indicated, the heat peak at 320°–330° C. is ascribable to the beta type and the heat peak at 210°–220° C to the alpha type, respectively. In FIG. 1, the curve 1 represents the data for the magnesium system ($\alpha$) and the curve 2 the data for the sodium system ($\beta$).

TABLE 1

| Type of acetate salt | Content of water of crystallization (% by weight) | Crystal form | Shape of crystals | Size of crystals | Bulk density (g/cc) | Properties of shaped article molded of produced gypsum | |
|---|---|---|---|---|---|---|---|
| | | | | | | Normal consistency (% by weight) | Compressive strength (kg/cm²) |
| $Na^+$ | 6.8 | $\beta$ | Needle-shaped crystals | $L/D>5$ $D=1\sim2\mu$ | 1.00 | 40 | 120 |
| $Be^{++}$ | 7.0 | $\beta$ | Needle-shaped crystals | $L/D>10$ $D=1\sim2\mu$ | 1.00 | 40 | 90 |
| $NH_4^+$ | 20.0 | dihydrate | Needle-shaped crystals | $L/D=10$ $D=5\sim10\mu$ | 1.09 | — | — |
| $Zn^{++}$ | 7.0 | $\alpha$ | Crystals in the shape of hexagonal prisms | $L/D>4-5$ $D=10\sim20\mu$ | 0.90 | 40 | 300 |
| $Cu^{++}$ | 7.2 | $\beta$ | Needle-shaped crystals | $L/D>10$ $D=1\sim2\mu$ | 0.90 | 40 | 80 |
| $Mg^{++}$ | 6.4 | $\alpha$ | Crystals in the shape of hexagonal prisms | $L/D=5$ $D=10\sim20\mu$ | 1.27 | 40 | 320 |

Note : L/D=Length/diameter

EXAMPLE 2

An aqueous solution was obtained by dissolving 30 parts by weight of magnesium acetate and 0.5 part by weight of magnesium citrate as the crystallization accelerating agent in 69.5 parts by weight of water. While the aqueous solution was kept boiling, 10 parts by weight of the same gypsum as used in Example 1 was added to the aqueous solution and allowed to undergo reaction for three hours. By following the procedure of Example 1 thereafter, calcium sulfate hemihydrate was obtained.

Separately, the same experiment was performed under the same conditions by using the aqueous solution obtained by dissolving 30 parts by weight of sodium acetate and 0.5 part by weight of sodium citrate in 69.5 parts by weight of water. The same experiment was also performed under the same conditions by using an aqueous solution obtained by dissolving 30 parts by weight of zinc acetate in conjunction with 0.5 part by weight of magnesium citrate in 69.5 parts by weight of water. The results are shown in Table 2 below.

TABLE 2

| Kind of acetate | Type of citrate | Content of water of crystallization (% by weight | Crystal form | Shape of crystals | Size of crystals | Bulk density (g/cc) | Properties of shaped article molded of produced gypsum | |
|---|---|---|---|---|---|---|---|---|
| | | | | | | | Normal consistency (% by weight) | Compressive Strength (kg/cm²) |
| Sodium acetate | Sodium citrate | 6.8 | $\beta$ | Block-shaped crystals | $L/D=5$ $D=2\sim5\mu$ | 1.22 | 40 | 100 |
| Magnesium acetate | Magnesium citrate | 6.4 | $\alpha$ | Crystals in the shape of hexagonal | $L/D=2\sim3$ $D=20\sim30\mu$ | 1.50 | 40 | 300 |

TABLE 2—continued

| Kind of acetate | Type of citrate | Content of water of crystallization (% by weight) | Crystal form | Shape of crystals | Size of crystals | Bulk density (g/cc) | Properties of shaped article molded of produced gypsum | |
|---|---|---|---|---|---|---|---|---|
| | | | | | | | Normal consistency (% by weight) | Compressive Strength (kg/cm²) |
| Zinc acetate | Magnesium citrate | 6.5 | α | prisms Crystals in the shape of hexagonal prisms | L/D=4–5 D=20~30μ | 1.46 | 40 | 285 |

Note: L/D=Length/diameter

EXAMPLE 3

An aqueous solution was prepared by dissolving 30 parts by weight of magnesium acetate and 3 parts by weight of citric acid in 67 parts by weight of water. While this aqueous solution was kept boiling, 10 parts by weight of the same gypsum as used in Example 1 was added to the aqueous solution, allowed to undergo reaction for three hours and processed thereafter by following the procedure of Example 1 to produce calcium sulfate hemihydrate. The results are shown in Table 3 below.

TABLE 3

| Type of acetate | Content of water of crystallization (% by weight) | Crystal form | Shape of crystals | Size of crystals | Bulk density (g/cc) | Properties of shaped article molded of produced gypsum | |
|---|---|---|---|---|---|---|---|
| | | | | | | Normal consistency (% by weight) | Compressive strength (kg/cm²) |
| Magnesium acetate | 6.3 | α | Crystals in the shape of hexagonal prisms | L/D=2~3 D=20~30μ | 1.45 | 40 | 290 |

Note: L/D=Length/diameter

EXAMPLE 4

Figure 2:
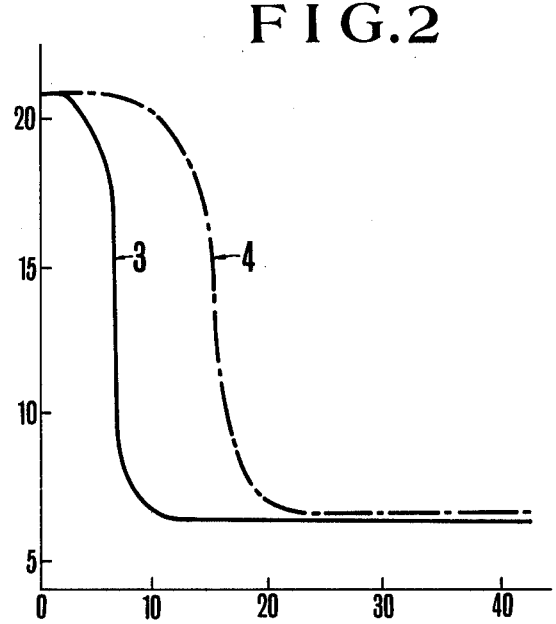
FIG. 2 is a graph showing the relationship between the content of water of crystallization (% by weight) in the product gypsum of Example 4 and the content of magnesium acetate (% by weight) present in the aqueous solution used in Example 4, the hydrated calcium sulfate product being obtained by treating gypsum for a prescribed length of time in a solution produced by adding a fixed amount of propionic acid to an aqueous solution containing magnesium acetate in a varying concentration.

To 100 parts by weight of an aqueous solution containing 12 parts by weight of propionic acid and also containing magnesium acetate in a varying concentration, 10 parts by weight of the same gypsum as used in Example 1 was added. The resulting solution was boiled for 2 hours or 3 hours and thereafter processed by following the procedure of Example 1 to produce calcium sulfate hemihydrate. The hydrated calcium sulfate was tested for the content of water of crystallization (% by weight). The results are shown in FIG. 2. In FIG. 2, the vertical axis of the graph is graduated for the content of water of crystallization (% by weight) of the produced gypsum and the horizontal axis for the content of magnesium acetate (% by weight) in the aqueous solution, respectively. In this graph, curve 3 represents the data obtained for the treatment involving three hours of boiling and the curve 4 those obtained from the treatment involving two hours of boiling, respectively.

When the calcium sulfate hemihydrate produced in the aqueous solution containing magnesium acetate in a concentration of 10% was subjected to differential heat analysis, it was ascertained to be of alpha type crystals.

EXAMPLE 5

Figure 3:
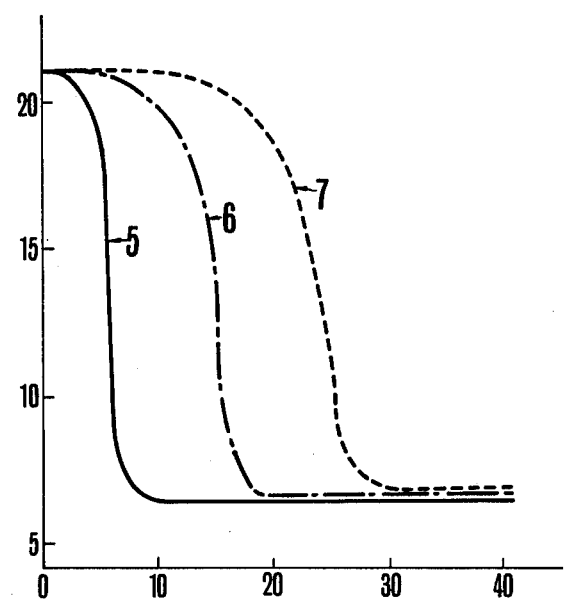
FIG. 3 is a graph showing the relationship between the content of water of crystallization (% by weight) in the gypsum produced in Example 5 and the content of magnesium acetate (% by weight) present in the aqueous solution used in Example 5, the produced hydrated calcium sulfate being obtained by treating gypsum for a prescribed length of time in an aqueous solution containing magnesium acetate in a varying concentration (with a fixed amount of magnesium citrate incorporated therein as the crystallization accelerating agent).

To 100 parts by weight of an aqueous solution containing 0.5% by weight of magnesium citrate as the crystallization accelerating agent and also containing magnesium acetate in a varying concentration, 10 parts by weight of the same gypsum as used in Example 1 was added and boiled for 2 hours, 3 hours or 5 hours. The calcium sulfate hemihydrate consequently produced was tested for the content of water of crystallization (% by weight). The results are shown in FIG. 3. The calcium sulfate hemihydrate thus obtained were confirmed to be of alpha type crystals by a procedure similar to that of Example 4. In FIG. 3, the vertical axis of the graph is graduated for the content of water of crystallization (% by weight) or the produced hydrated calcium sulfate and the horizontal axis for the content of magnesium acetate (% by weight) present in the aqueous solution, respectively. In FIG. 3, curve 5 represents the data obtained from the treatment involving five hours of boiling, curve 6 those involving three hours of boiling and curve 7 those involving two hours of boiling, respectively.

As is plain from the comparison of FIG. 2 and FIG. 3, the rate at which the transition of the gypsum used as the starting material to the alpha type calcium sulfate hemihydrate proceeds is accelerated when the treatment is performed by using a solution obtained by adding a lower monocarboxylic acid (propionic acid, for example) to an aqueous solution of magnesium acetate.

EXAMPLE 6

While an aqueous solution obtained by dissolving 30 parts by weight of magnesium acetate, 20 parts by weight of acetic acid and 0.5 part by weight of magnesium citrate in 100 parts by weight of water was kept at 98° C, 30 parts by weight of gypsum consisting of beta type calcium sulfate hemihydrate and gypsum dihydrate and containing 16% by weight of water of crystallization was added to the aqueous solution, agitated for reaction for three hours and thereafter processed by following the procedure of Example 1 to produce alpha type calcium sulfate hemihydrate in the shape of hexagonal prisms containing 6.3% by weight of water of crystallization. The crystals had a size of L/D ≈ 4, a length of about 20 μ, and a bulk density of 1.48 g/cc. This calcium sulfate hemihydrate exhibited excellent properties including a normal consistency of about 40% by weight of compressive strength of 300 kg/cm².

What is claimed is:

1. A method for the production of alpha type hemihydrated calcium sulfate, which method comprises:

(a) suspending hydrated calcium sulfate containing ⅓ to 2 mols of water of crystallization in an aqueous solution containing at least 10% by weight of at least one member selected from the group consisting of magnesium salts of lower monocarboxylic acids having one to four carbon atoms and zinc salts of lower monocarboxylic acids having one to four carbon atoms; and (b) subsequently heating the resultant suspension under atmospheric pressure at a temperature in the range of from 80° C to the boiling point of said aqueous solution.

2. The method according to claim 1, wherein said calcium sulfate containing ⅓ to 2 moles of water of crystallization is beta type calcium sulfate hemihydrate, gypsum, a mixture of alpha type calcium sulfate hemihydrate with beta type calcium sulfate hemihydrate, a mixture of alpha type calcium sulfate hemihydrate with gypsum or a mixture of alpha type calcium sulfate hemihydrate with beta type calcium sulfate hemihydrate and gypsum.

3. A method for the production of alpha type calcium sulfate hemihydrate, which method comprises:

(a) adding a lower monocarboxylic acid having one to four carbon atoms to an aqueous solution containing at least 10% by weight of at least one member selected from the group consisting of magnesium salts of lower monocarboxylic acids having one to four carbon atoms and zinc salts of lower monocarboxylic acids having one to four carbon atoms;

(b) suspending a hydrated calcium sulfate containing ⅓ to 2 mols of water of crystallization in the resultant solution; and (c) subsequently heating the resultant suspension under atmospheric pressure at a temperature in the range of from 80° C to the boiling point of said resultant solution.

4. The method according to claim 3, wherein said lower monocarboxylic acid is added to said aqueous solution in an amount of from 1 to 20% by weight based on said aqueous solution.

5. The method according to claim 3, wherein said calcium sulfate containing ⅓ to 2 moles of water of crystallization is beta type calcium sulfate hemihydrate, gypsum, a mixture of alpha type calcium sulfate hemihydrate with beta type calcium sulfate hemihydrate, a mixture of alpha type calcium sulfate hemidrate with gypsum or a mixture of alpha type calcium sulfate hemihydrate with beta type calcium sulfate hemihydrate and gypsum.

* * * * *

UNITED STATES PATENT AND TRADEMARK OFFICE
CERTIFICATE OF CORRECTION

PATENT NO. : 4,091,080
DATED : May 23, 1978
INVENTOR(S) : Kosugi et al

Page 1 of 2

It is certified that error appears in the above-identified patent and that said Letters Patent are hereby corrected as shown below:

IN THE ABSTRACT:

Line 1, delete "gypsum".

IN THE SPECIFICATION:

Column 1, line 46, change "gfor" to read --for--.

lines 49 and 50, ", gypsum hemihydrate" to read --hemihydrate, gypsum--;

line 65, change "possessed" to --having--.

Table 2, change "Kind of acetate" to --Type of acetate--;

change "Content of water of crystallization (% by weight" to read --Content of water of crystallization (% by weight)--;

after "hexagonal" insert --prisms--.

Table 2 - Continued (Columns 7 and 8).

Change "Kind of acetate" to --Type of acetate--;

UNITED STATES PATENT AND TRADEMARK OFFICE
CERTIFICATE OF CORRECTION

PATENT NO. : 4,091,080
DATED : May 23, 1978
INVENTOR(S) : Kosugi et al

It is certified that error appears in the above-identified patent and that said Letters Patent are hereby corrected as shown below:

Table 2 - Continued (Columns 7 and 8):

Change "Content of water of crystallization (% by weight" to read --Content of water of crystallization (% by weight)--;

In the column marked "Shape of crystals" delete "prisms" before "Crystals in".

IN THE CLAIMS:

Column 10, line 22, change "hemidrate" to --hemihydrate--.

Signed and Sealed this

Twelfth Day of December 1978

[SEAL]

Attest:

RUTH C. MASON
Attesting Officer

DONALD W. BANNER
Commissioner of Patents and Trademarks